United States Patent
Sudhakaran et al.

(10) Patent No.: US 12,045,657 B2
(45) Date of Patent: Jul. 23, 2024

(54) POLICY MANAGEMENT IN TARGET ENVIRONMENTS

(71) Applicant: Hewlett Packard Enterprise Development LP, Houston, TX (US)

(72) Inventors: Sonu Sudhakaran, Bangalore Karnataka (IN); Divakar Padiyar Nandavar, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 445 days.

(21) Appl. No.: 17/455,032

(22) Filed: Nov. 16, 2021

(65) Prior Publication Data
US 2022/0291965 A1 Sep. 15, 2022

(30) Foreign Application Priority Data
Mar. 10, 2021 (IN) .............................. 202141010144

(51) Int. Cl.
*G06F 9/50* (2006.01)
(52) U.S. Cl.
CPC .................................. *G06F 9/5027* (2013.01)
(58) Field of Classification Search
CPC .. G06F 9/5027; G06F 9/5072; G06F 9/45558; G06F 2009/4557
See application file for complete search history.

(56) References Cited

U.S. PATENT DOCUMENTS

| | | | |
|---|---|---|---|
| 8,032,623 B2 | 10/2011 | Colby et al. | |
| 9,378,390 B2 | 6/2016 | Nefedov et al. | |
| 9,787,718 B2 | 10/2017 | Kapoor et al. | |
| 9,973,539 B2 | 5/2018 | Abuelsaad et al. | |
| 2009/0132647 A1* | 5/2009 | Colby | H04L 63/102 709/203 |
| 2013/0263206 A1* | 10/2013 | Nefedov | G06F 21/604 726/1 |
| 2016/0359920 A1* | 12/2016 | Abuelsaad | G06F 21/6209 |
| 2021/0303347 A1* | 9/2021 | Sloma | G06F 11/3414 |

OTHER PUBLICATIONS

Docker; printed on Dec. 11, 2020; 14 pages; from webpage: https://www.openpolicyagent.org/docs/latest/docker-authorization/.

* cited by examiner

*Primary Examiner* — Brian W Wathen
(74) *Attorney, Agent, or Firm* — Hewlett Packard Enterprise Patent Department

(57) ABSTRACT

Examples described herein relate to policy management in target environments. A workload attestation request including a workload specification of a workload is received. A workload profile is determined based on the workload specification. A policy stored in a policy database is identified based on the workload profile. An attestation identifier indicating the workload profile is provided in response to the workload attestation request. On receiving a policy request including the attestation identifier from a controller node at a target environment, policies are compiled from the policy database using the attestation identifier, and provided to the controller node, which applies the policy in the target environment.

20 Claims, 8 Drawing Sheets

POLICY MANAGEMENT IN TARGET ENVIRONMENTS

BACKGROUND

Cloud-native computing is an approach to build applications or workloads as a set of microservices running in containers. A container includes workloads and necessary dependencies into one package so that the workload is executable in different cloud environments. The deployment, management, and execution of the containerized workloads in various cloud environments is performed using a workload orchestration platform. Such deployment and execution of the workloads is dependent on the security of the cloud environments.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

Figure 1:
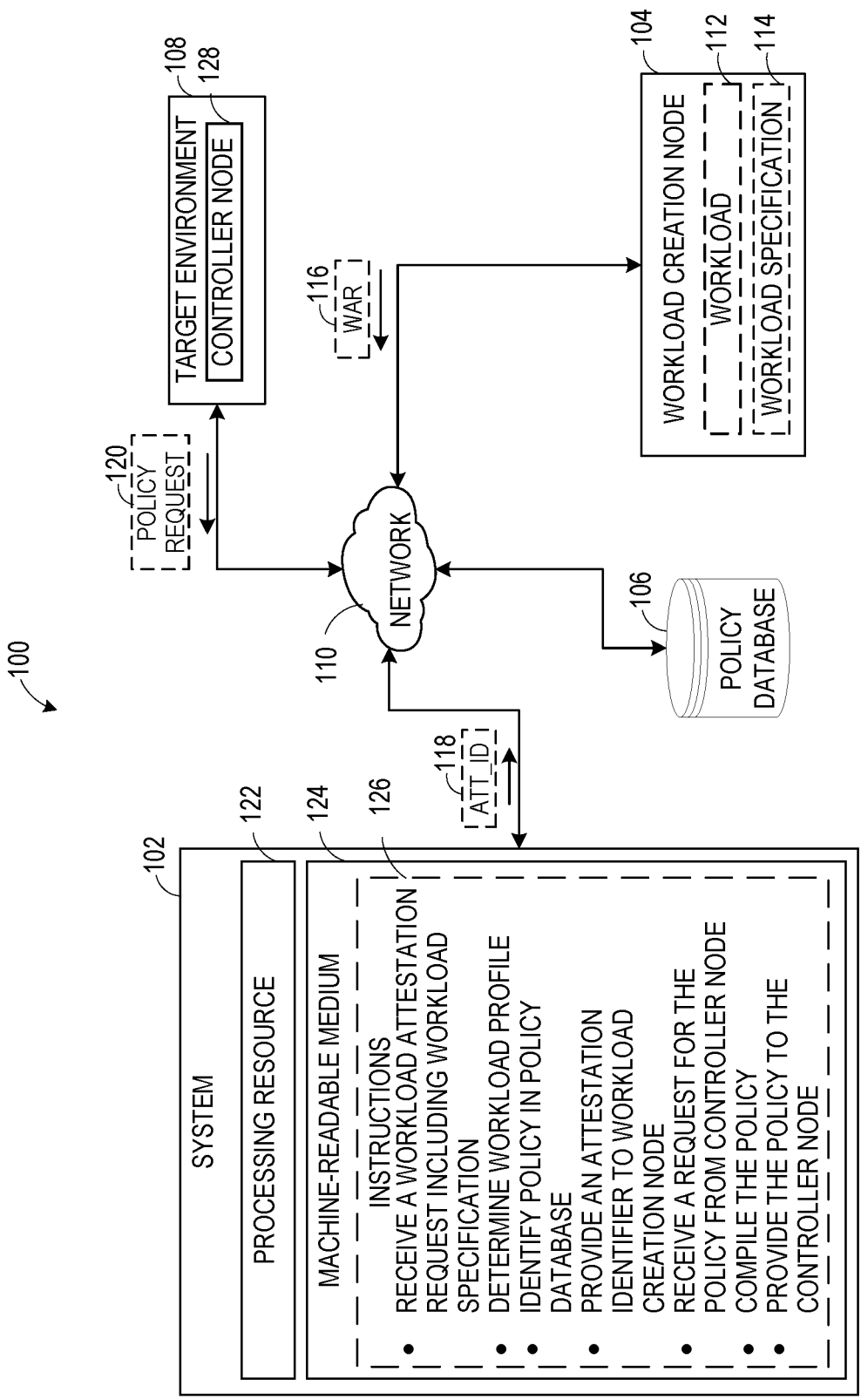
FIG. 1 depicts a networked system including a system for policy management at a target environment, in accordance with an example.

It is emphasized that, in the drawings, various features are not drawn to scale. In fact, in the drawings, the dimensions of the various features may have been increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. Further, the term "and/or" as used herein refers to and encompasses any and all possible combinations of the associated listed items. It will also be understood that, although the terms first, second, third, fourth, etc., may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Cloud-native computing is an approach to build applications or workloads as a set of microservices running in containers. A container includes workloads and necessary dependencies into one package so that the workload is executable in different cloud environments. Examples of such workloads may include, but are not limited to, a virtual machine, a container, a pod, a containerized application, or any piece of code that can be realized as a microservice.

Workloads may be managed via a workload orchestration system such as Kubernetes. The workload orchestration system may be operational on a computing node, hereinafter referred to as a controller node. The controller node may receive a workload deployment request to deploy a workload and schedule deployment of the workload on one or more target cloud environments. Various features of cloud-native computing, such as microservice architecture, modern design, containerization, automation, etc., allow faster development and delivery of new workloads and quick time to resolve issues.

However, the deployment, management, and execution of the workloads depends on the security of the target environments and the workloads. For example, the workloads and the target environments may have specific control and access rights for ensuring that the security of the underlying target environment is not compromised as well as for reducing the risk of exposing workload data. The control and access rights may be implemented based on a set of governance rules, hereinafter referred to as policies. In some approaches, policies may be defined or created during workload development for governing the control and access rights for the workload. Policies, such as native policies, may also be implemented by a cloud provider for ensuring security and execution of workloads.

With advancements in cloud-native technologies, the number of target environments keeps increasing and therefore managing policies for each target environment and for each workload becomes a challenge. Each cloud environment, for example, may support several thousands of workloads developed by different teams and organizations from various geographical locations. Additionally, each workload may require different policies to impose a specific set of controls and access rights. Therefore, managing policies for each workload based on the workload characteristics and the underlying constructs of each target environment is tedious and labor intensive.

Moreover, some target environments may only provide native policies to control the infrastructure but may not provide the necessary policies whenever a workload is deployed. Furthermore, applying the correct policies in the target environment may require constant monitoring. For example, a new update to an existing policy or an update in the workload version may require re-enforcement or revocation of certain policies. Some of the existing solutions do not provide dynamic gathering of the latest policies required for the workload versions. Therefore, applying policies in a target environment based on the behavior of a workload is a challenging task.

To that end, in accordance with aspects of the present disclosure, dynamic policy management based on workload profile is presented. In some examples, a workload attestation request may be received from a workload creation node. The workload attestation request may include a workload specification of a workload. A workload profile may be determined based on the workload specification. Based on the workload profile, a policy stored in a policy database may be identified. In response to the workload attestation request, an attestation identifier, indicating the workload profile, may be provided to the workload creation node. Further, a request for the policy may be received from a controller node at a target environment. The request may include the attestation identifier. Using the attestation identifier, the policy may be compiled from the policy database. Furthermore, the policy may be provided to the controller node, which may apply the policy in the target environment.

As will be appreciated, examples presented herein facilitate enhanced dynamic policy management in cloud-native environments based on workload profiles. Examples presented herein reduce or eliminate the need for workload developers to define policies for the workload. The developers may provide only a workload specification, which may be used for attesting the workload using an attestation identifier. The attestation identifier may be used to dynamically compile relevant policies regardless of the number and type of the target environments for workload deployment. The dynamic compilation of policies based on the attestation identifier may provide enhanced performance and security for the workloads on the target environments (e.g., Kubernetes clusters) either in a customer's on-premise private cloud datacenter owned or leased by the customer or consumed as a public cloud provider's as-a-service offering (e.g., through a pay-per-use or consumption-based financial model). Further, enhanced dynamic compilation of policies as effected by various example aspects presented herein ensures that the latest policies necessary for the workloads are applied at the target environment. For instance, any updates to the policies in the policy database or to the workload may be considered before retrieving policies from the policy database. Moreover, custom policies that are not available in the target environment may also be compiled and applied based on the workload profile.

Referring now to the drawings, in FIG. 1, a networked system 100 is depicted, in accordance with an example. The networked system 100 may include a policy management system 102, hereinafter referred to the system 102, a workload creation node 104, a policy database 106, and a target environment 108 coupled to each other via a network 110. In some examples, the networked system 100 may be a distributed system where the policy management system 102, the workload creation node 104, the policy database 106, and the target environment 108 may be located at physically different locations (e.g., on different racks, on different enclosures, in different buildings, in different cities, in different countries, and the like) while being connected via the network 110.

Examples of the network 110 may include, but are not limited to, an Internet Protocol (IP) or non-IP-based local area network (LAN), wireless LAN (WLAN), metropolitan area network (MAN), wide area network (WAN), a storage area network (SAN), a personal area network (PAN), a cellular communication network, a Public Switched Telephone Network (PSTN), and the Internet. Communication over the network 110 may be performed in accordance with various communication protocols such as, but not limited to, Transmission Control Protocol and Internet Protocol (TCP/IP), User Datagram Protocol (UDP), IEEE 802.11, and/or cellular communication protocols. The communication over the network 110 may be enabled via a wired (e.g., copper, optical communication, etc.) or wireless (e.g., WiFi®, cellular communication, satellite communication, Bluetooth, etc.) communication technologies. In some examples, the network 110 may be enabled via private communication links including, but not limited to, communication links established via Bluetooth, cellular communication, optical communication, radio frequency communication, wired (e.g., copper), and the like. In some examples, the private communication links may be direct communication links between the system 102, the workload creation node 104, the policy database 106, and the target environment 108.

The workload creation node 104 may be a device including a processor or microcontroller and/or any other electronic component, or a device or system that may facilitate various workload development, compute and/or data storage services. Examples of the workload creation node 104 may include, but are not limited to, a desktop computer, a laptop, a smartphone, a server, a computer appliance, a workstation, a storage system, or a converged or hyperconverged system, and the like. In FIG. 1, although the networked system 100 is shown to include one workload creation node 104, the networked system 100 may include any number of workload creation nodes, without limiting the scope of the present disclosure. The workload creation node 104 may have similar or varying hardware and/or software configurations in a given implementation of the networked system 100.

The term workload may refer to a computing resource including, but not limited to, an application (e.g., software program), a virtual machine (VM), a container, a pod, or a containerized application. In some examples, workload may include any piece of code that may be developed as a microservice. As will be understood, a workload such as a VM may be an instance of an operating system hosted on a given worker node via a VM host programs such as a hypervisor. Further, a workload such as a container may be a packaged application with its dependencies (e.g., operating system resources, processing allocations, memory allocations, etc.) hosted on a given worker node via a container host programs such as a container runtime (e.g., Docker Engine), for example. Further, in some examples, workloads may include pods that are formed by grouping one or more containers. For example, a set of containers that are associated with a common application may be grouped to form a pod.

The target environment 108 may facilitate resources, for example, compute, storage, and/or networking capabilities, for one or more workloads to execute thereon. Examples of the target environment 108 may include, but are not limited to, a server, clusters of servers, container-orchestration systems, such as Kubernetes, clusters of container-orchestration systems, a computer appliance, a workstation, a desktop computer, a laptop, a smartphone, a storage system, or a converged or hyperconverged system, and the like. By way of example, while some target environments may have high-end compute capabilities, some target environments may facilitate strong data security, and certain target environments may have enhanced thermal capabilities. In FIG.

1, although the networked system 100 is shown to include one target environment 108, the networked system 100 may include any number of target environments, without limiting the scope of the present disclosure.

In the description, the workload 112 is described as being an application and the target environment 108 is described as one or more Kubernetes clusters, for illustration purposes. Applications in containers may be managed via a container-orchestration system such as, for example, Kubernetes. In the example of FIG. 1, the workload creation node 104 is shown to facilitate workload creation or development. For example, developers may work on the workload creation nodes 104 to write and develop workloads. Although a single workload is shown as being developed at the workload creation node 104 as depicted in FIG. 1, the workload creation node 104 may facilitate development of any number of workloads 112 depending on respective hardware and/or software configurations. In some examples, the target environment 108 may also serve as a workload creation node 104 or vice-versa.

During or after development of the workload 112 at the workload creation node 104, a workload specification 114 may also be developed that includes information regarding characteristics of workload 112. The characteristics of the workload may specify various access and control rights. For example, the access rights may include access to communication endpoints, such as port 80, port 443, port TCP/5607. The control rights may include measures to control the behavior of the workload. For example, the control rights may include accepting only HTTPS, accepting only a certain number of requests, allowing only secure or encrypted SSH connection, or rejecting SSH/22 connection. The system 102 may receive a workload attestation request 116 (labeled as WAR in FIG. 1) including the workload specification 114 corresponding to the workload 112 from the workload creation node 104. The system 102 may attest the workload 112 based on the workload specification 114 and manage the policies required at the target environment 108 based on the attestation. For example, the system 102 may provide a workload attestation identifier 118 (labeled as ATT_ID in FIG. 1) to the workload creation node 104, which may provide a workload deployment request to the target environment 108. Further, the system 102 may also receive a policy request 120 from the target environment 108 for deploying the workloads 112 in the target environment 108 (described later).

As depicted in FIG. 1, in some examples, the system 102 may be a device including a processor or microcontroller and/or any other electronic component, or a device or system that may facilitate various compute and/or data storage services, for example. Examples of the system 102 may include, but are not limited to, a desktop computer, a laptop, a smartphone, a server, a computer appliance, a workstation, a storage system, or a converged or hyperconverged system, and the like that is configured to manage polices in the target environment 108 for the workload 112. Further, in certain examples, the system 102 may be or may include a virtual machine or a containerized application executing on hardware in the networked system 100.

In some examples, the system 102 may include a processing resource 122 and a machine-readable medium 124. The machine-readable medium 124 may be any electronic, magnetic, optical, or other physical storage device that may store data and/or executable instructions 126. For example, the machine-readable medium 124 may include one or more of a Random Access Memory (RAM), an Electrically Erasable Programmable Read-Only Memory (EEPROM), a storage drive, a flash memory, a Compact Disc Read Only Memory (CD-ROM), and the like. The machine-readable medium 124 may be non-transitory. As described in detail herein, the machine-readable medium 124 may be encoded with the executable instructions 126 to perform one or more methods, for example, methods described in FIGS. 3, 4A, and 4B.

Further, the processing resource 122 may be a physical device, for example, one or more central processing unit (CPU), one or more semiconductor-based microprocessors, one or more graphics processing unit (GPU), application-specific integrated circuit (ASIC), a field programmable gate array (FPGA), other hardware devices capable of retrieving and executing instructions 126 stored in the machine-readable medium 124, or combinations thereof. The processing resource 122 may fetch, decode, and execute the instructions 126 stored in the machine-readable medium 124 to manage policies for a workload (described further below). As an alternative or in addition to executing the instructions 126, the processing resource 122 may include at least one integrated circuit (IC), control logic, electronic circuits, or combinations thereof that include a number of electronic components for performing the functionalities intended to be performed by the system 102 (described further below). Moreover, in certain examples, where the system 102 may be a virtual machine or a containerized application, the processing resource 122 and the machine-readable medium 124 may represent a processing resource and a machine-readable medium of the hardware or a computing system that hosts the system 102 as the virtual machine or the containerized application.

Figure 2:
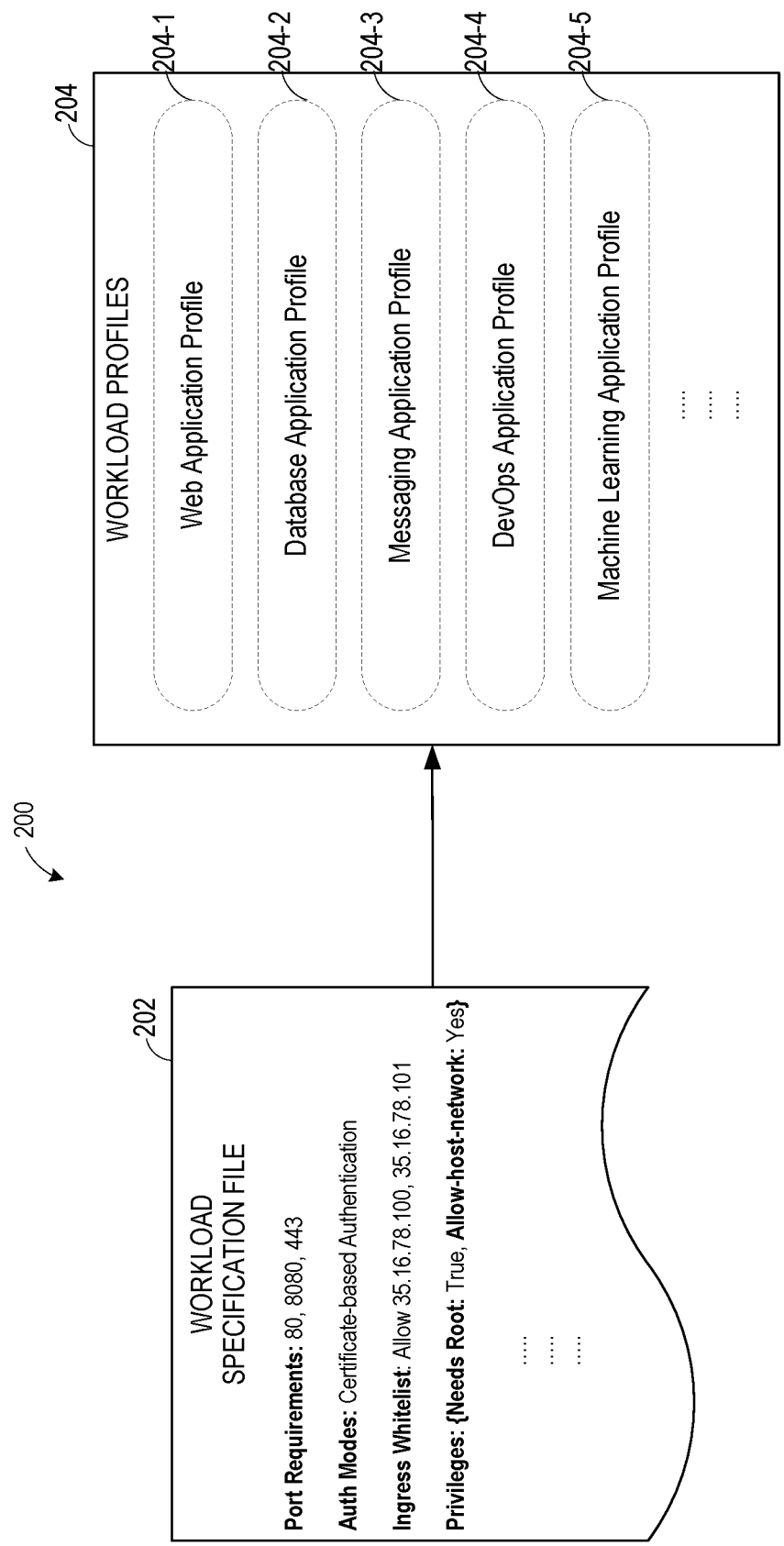
FIG. 2 depicts a workload specification and associated workload profiles, in accordance with an example.

During operation, the processing resource 122 may receive the workload attestation request 116 including the workload specification 114 from the workload creation node 104. In some examples, the processing resource 122 may receive workload attestation requests from different workload creation nodes (not shown in FIG. 1). Each workload attestation request may include a workload specification associated with a workload developed on a respective workload creation node. FIG. 2 is a block diagram 200 depicting workload specification file 202 and an example list of workload profiles 204. The workload profiles 204 may include various types of workloads. For example, an application workload may include web application profile 204-1, database application profile 204-2, messaging application profile 204-3, DevOps application profile 204-4, a machine learning application profile 204-5, and the like. In some examples, the workload profiles 204 may be stored locally at the system 102 or, alternatively, may be stored in remote database accessible over the network 110. In some examples, the system 102 may receive the workload attestation request 116 in the form of a file. Upon receipt of the workload attestation request 116, the processing resource 122 may store the file, for example, a workload specification file 202, in the machine-readable medium 124.

The workload specification file 202 may include the workload specification 114, which describes the static and runtime behavior of an associated workload. In particular, the workload specification 114 may set certain requirements of the workload. In some examples, the workload specification file 202 may include configurations, such as application ports, request privileges, ingress whitelist, authentication modes, exposure modes, and the like. For each configuration, a list of sub-configurations and associated values may be included in the workload specification. For example, the application ports may include the list of sub-configurations, such as Port 80, Port 8080, Port 443, Port 22, Port 20, and the like. Authentication modes may include certificate-based authentication. Ingress list may include list of sources (E.g.: IP addresses 35.16.78.100, 35.16.78.101) and domains (E.g.: hpe.com) allowed. For request privileges, the sub-configurations may include roots needed (True/False) and/or allow-host network (Yes/No). Each of the workload profiles 204 includes some or all of the possible configurations and/or sub-configurations included in workload specifications. The workload profiles 204 may have predefined values for configurations and/or sub-configurations that are selected as archetypical of a workload represented by that workload profile. The predefined values of the workload profiles 204 may also be modified periodically to avoid state-of-the-art security lapses.

Referring back to FIG. 1, the system 102 may determine one or more workload profiles 204 based on the workload specification file 202. For instance, the values for each sub-configuration in the workload specification file 202 may be used for identifying the one or more workload profiles 204. In some examples, determining the one or more workload profiles 204 may be based on a best match between the configurations and sub-configurations of the workload specification file 202 and the corresponding predefined values of the workload profiles 204.

The system 102 may identify one or more policies stored in a policy database 106 based on the determined workload profiles 204. In some examples, the policy database 106 may store a plurality of policies that may be applicable to the target environment 108. In some examples, the plurality of policies may include custom policies, global policies or environment-specific policies. The global policies may be applicable in any environment, such as development, integration, or production environments. For example, a global policy for web application profile may include global access and control rights, such as allow only HTTPS or perform certificate authority validation. On the other hand, the environment-specific policies may be applicable to specific environments. For example, environment-specific policies for a web application profile in a development environment may include accepting a maximum of 100 requests per minute or allow downtime of resource during update. Similarly, the environment-specific policies for a web application profile in a production environment may include accepting a maximum of 1000 requests per minute or no downtime of resources during update. In various examples, the policy database 106 may be a remote database implemented on a server or any other computing device discussed earlier. Alternatively, the policy database 106 may be a local database in the system 102. The policy database 106 may use tags to link policies and the workload profiles 204. In some examples, the modification of the link between the policies and the one or more workload profiles 204 may be performed in response to a malicious attack on the workload, malfunctioning of the workload, non-execution of the workload, and the like. In some examples, the link between the policies and the workload profiles may also be modified through a user interface.

The system 102, in accordance with aspects of the present disclosure, may facilitate workload attestation and compilation of policies that may be a best fit to requirements of the workload 112. In some examples, the system 102 may provide an attestation identifier 118 to the workload creation node 104 in response to the workload attestation request 116. The attestation identifier may indicate the one or more workload profiles 204 associated with the workload 112. In some examples, the attestation identifier 118 may be automatically created by the system 102 based on the workload specification 114. Alternatively, in other examples, the attestation identifier 114 may also be created based on external inputs provided by a separate computing system. For instance, an administrator may review the workload specification manually by checking the workload design and architecture. The administrator may then approve the workload profiles associated with the workload 112. In some examples, both the automatic and manual attestation may be performed.

In some examples, the workload creation node 104—may send a workload deployment request to the controller node 128 for deploying the workload in the target environment 108. The workload deployment request may include the attestation identifier 118. In response to the workload deployment request, the system 102 may receive a request for one or more policies from the controller node 128 for deploying the workload 112. The request 120 may include the attestation identifier. The system 102 may compile the relevant policies from the policy database 106 using the attestation identifier 118. Compiling may include retrieving one or more policies associated with the attestation identifier from the policy database 106. In some examples, compiling may include retrieving relevant policy templates or policy statements based on the workload profiles 204 from the policy database 106 for creating custom policies. In some examples, the system may also check if the attestation identifier is valid before compiling. For instance, some attestation identifiers may be inactive beyond a certain time period or may not indicate updated workload profiles 204 associated with the workload 112.

The system 102 may then provide the policies to the controller node 128 for applying the policies in the target environment 108. As will be appreciated, the target environment 108 presented herein facilitates scheduling and deployment of the workload 112. In particular, by virtue of enhanced compilation of policies as effected by various example aspects presented herein, workload 112 may be executed on a well-equipped worker node having sufficient resources to fulfill requirements of the workloads. Applying the policies based on the workload profile may enable enhanced performance and security for workloads on networked systems (e.g., Kubernetes clusters) on customer's premise or as-a-service offering. Moreover, as the policies are updated or workload versions are updated, the updated policies are compiled automatically and dynamically during the operation, and manual intervention may be reduced or eliminated. An example of policy updating is described herein below with respect to FIG. 4B.

Figure 3:
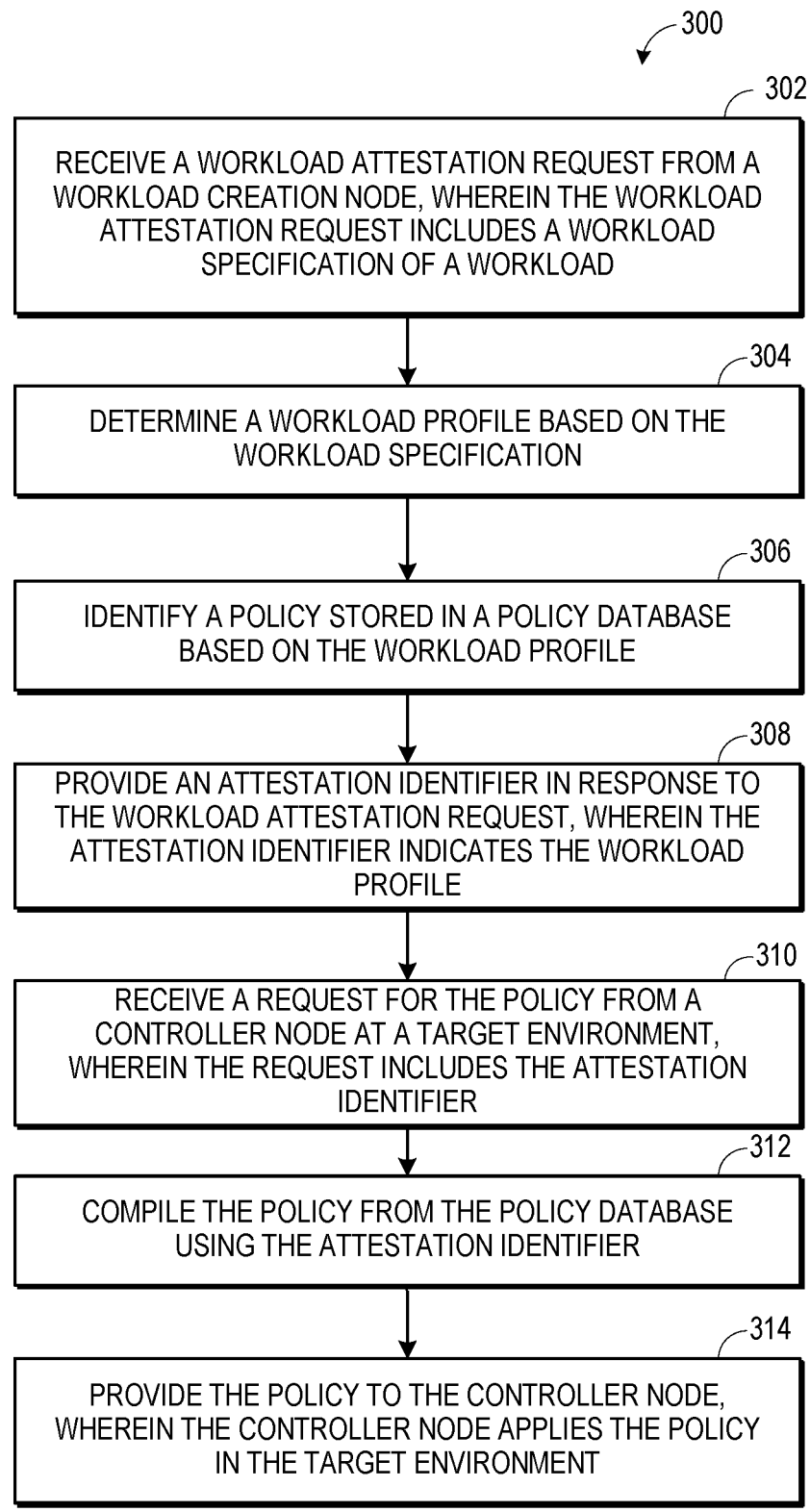
FIG. 3 is a flow diagram depicting a method for policy management in the target environments, in accordance with an example.

Referring now to FIG. 3, a flow diagram depicting a method 300 for managing policies in the target environment 108 is presented, in accordance with an example. For illustration purposes, the method 300 will be described in conjunction with the networked system 100 of FIG. 1 and elements of FIG. 2. The method 300 may include method blocks 302, 304, 306, 308, 310, 312 and 314 (hereinafter collectively referred to as blocks 302-314) which may be performed by a processor-based system such as, for example, the system 102. In particular, operations at each of the method blocks 302-314 may be performed by the processing resource 122 by executing the instructions 126 stored in the machine-readable medium 124 (see FIG. 1). Moreover, it is to be noted that in some examples, the order of execution of the blocks 302-314 may be different that shown in FIG. 3. For example, the blocks 302-314 may be performed in series, in parallel, or a series-parallel combination.

At block 302, the processing resource 122 may receive workload attestation request 116 for the workload 112 from the workload creation node 104, for example. The workload attestation request 116 may include the workload specification 114 indicating the characteristics of the workload 112 as described with respect to FIG. 2. At block 304, the processing resource 122 may determine one or more workload profiles 204 for the workload 112 based on the received workload attestation requests. Further, at block 306, the processing resource 122 may identify one or more policies stored in the policy database 106 based on the one or more workload profiles 204 determined at block 304. At block 308, the processing resource 122 may provide the attestation identifier 118 to the workload creation node 104. The attestation identifier 118 may indicate the one or more workload profiles 204 determined at block 304. The workload creation node 104 may send a workload deployment request to the controller node 128 for deploying the workload 112 at the target environment 108. The workload deployment request may include the attestation identifier 118. Further, at block 310, the processing resource 122 may receive a policy request 120 from the controller node 128 at the target environment 108. The policy request may include the attestation identifier 118. At block 312, the processing resource 122 may compile the policy from the policy database 106 using the attestation identifier. Further, at block 314, the processing resource 122 may provide the policy to the controller node 128 for applying the policy at the target environment 108.

Figure 4A:
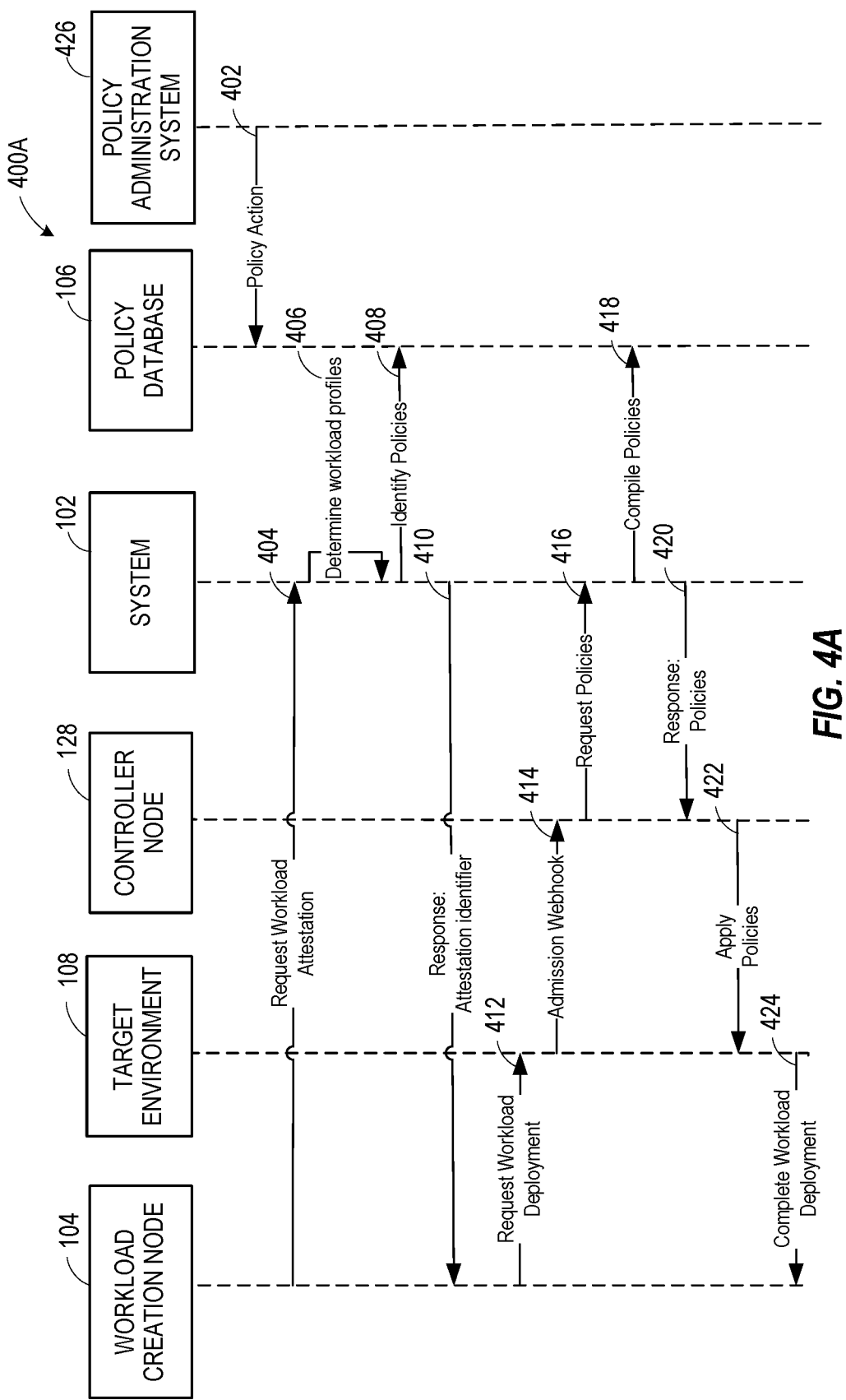
FIGS. 4A and 4B are signal diagrams depicting a method for policy management in the target environments, in accordance with another example.
Figure 4B:
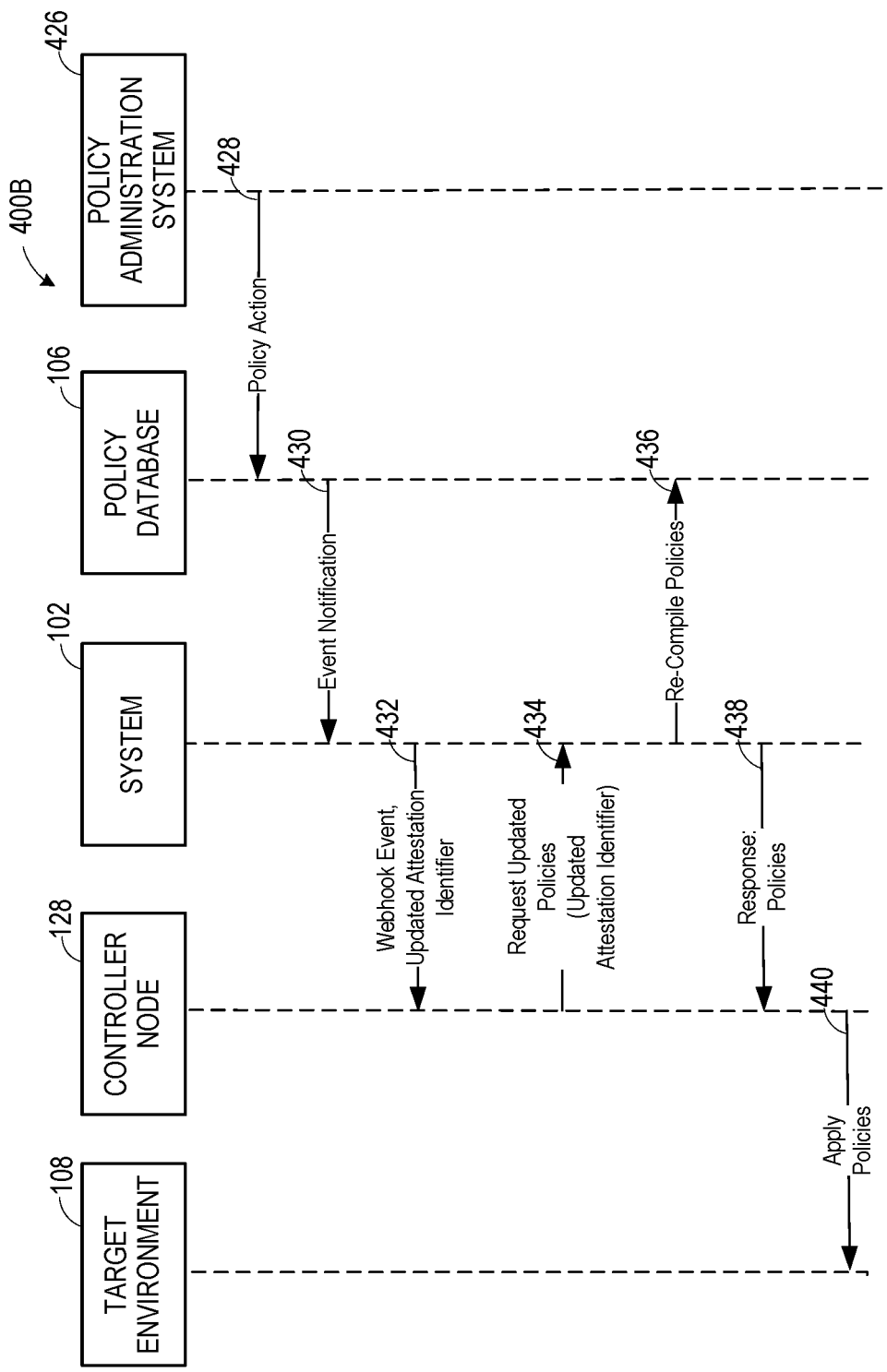

Moving now to FIGS. 4A and 4B, sequence diagrams depicting methods for policy management are presented, in accordance with another example. For illustration purposes, the sequences 400A and 400B will be described in conjunction with the networked system 100 of FIG. 1. FIG. 4A depicts a sequence diagram for managing policies for workload 112 during or before workload deployment in the target environment 108. The sequence 400A may include 402, 404, 406, 408, 410, 412, 414, 416, 418, 420, 422, and 424 (hereinafter collectively referred to as 402-424), which may be performed by processor-based systems as described earlier. In particular, operations of the sequence 402-424 may be performed by the processing resource 122 by executing the instructions 126 stored in the machine-readable medium 124. Moreover, it is to be noted that in some examples, the order of execution of 402-424 may be different from the one shown in FIG. 4A. For example, operations of 402-424 may be performed in series, in parallel, or a series-parallel combination.

At 402, a policy administration system 426 may perform one or more policy actions on the policies stored in the policy database 106 (an example policy administration system 426 will be described further herein below with respect to FIG. 5). At 404, the processing resource 122 may receive a workload attestation request 116 for a workload 112 from the workload creation node 104, for example. The workload attestation request 116 may include a workload specification 114. Further, at 406, the processing resource 122 may determine the one or more workload profiles 204 based on the workload specification 114. At 408, the processing resource 122 may identify one or more policies stored in the policy database 106. In some examples, identifying the one or more policies may be performed automatically, while in other examples, the policy administration system 426 may manually identify the one or more policies. Further, at 410, the processing resource 122 may provide a response to the workload creation node 104. The response may include the attestation identifier, which may indicate the one or more workload profiles 204 associated with the workload 112. In some examples, the attestation identifier may be modified based on user input provided manually by an administrator.

Further, at 412, the target environment 108 may receive a workload deployment request including the attestation identifier 118 of the workload 204 from the workload creation node 104. In some examples, the attestation identifier may expire after a predetermined period. At 414, an admission webhook may listen to the workload deployment requests received at the target environment 108. At 416, the processing resource 122 may receive a request for policies from the controller node 128 in response to listening of the workload deployment request at the target environment 108. The request for policies may include the attestation identifier associated with the workload 204. Further, at 418, the processing resource 122 may compile the policies from the policy database 106 based on the attestation identifier 118. In some examples, compiling may include validating the attestation identifier 118 received from the controller node 128 and retrieving the policy associated with the attestation identifier from the policy database 106. At 420, the processing resource 122 may provide the compiled policies as a response to the controller node 128. At 422, the controller node 128 may apply the policies in the target environment 108. In some examples, applying the policies in the target environment 108 may include setting up native policies and setting up policy webhooks. The native policy may include constructs and definitions built in to and provided by the target environment 108. Different environments may provide different types of native policies. For instance, in a Kubernetes cluster, examples of native policies may include pod security policies, network policies, scaling policies (e.g., horizontal pod autoscaler), and the like. The native constructs and definitions may be used for realizing the compiled policies in the target environment 108. The policy webhooks may be used by the controller node 12 to accept or reject workload deployment or policy updates. At 424, the workload 204 is deployed at the target environment 108 using the compiled policies.

FIG. 4B depicts a sequence diagram for managing policies for workload 204 already deployed in the target environment 108. The sequence 400B may include 428, 430, 432, 434, 436, 438, and 440 (hereinafter collectively referred to as 428-440), which may be performed by processor-based systems as described earlier. At 428, the policy administration system 426 may perform one or more policy actions on the one or more policies stored in the policy database 106. In various examples, the policy actions may include policy creation, policy inheritance, policy extension, policy cloning, policy validation, policy update, or policy revocation (the policy actions will be described further herein below). At 430, the processing resource 122 may receive an event notification indicative of the one or more policy actions performed at the policy database 106. At 432, the processing resource 122 may provide an updated attestation identifier to the controller node 128 at the target environment 108 where the workload is deployed. At 434, the processing resource 122 may receive a request for updated policies from the controller node 128 based on the updated attestation identifier. At 436, the processing resource 122 may re-compile the updated policies from the policy database 106 based on the updated attestation identifier. At 438, the processing resource 122 may provide the updated policies as a response to the controller node 128. Further, at 440, the controller node 128 may apply the updated policies to the target environment 108.

Figure 5:
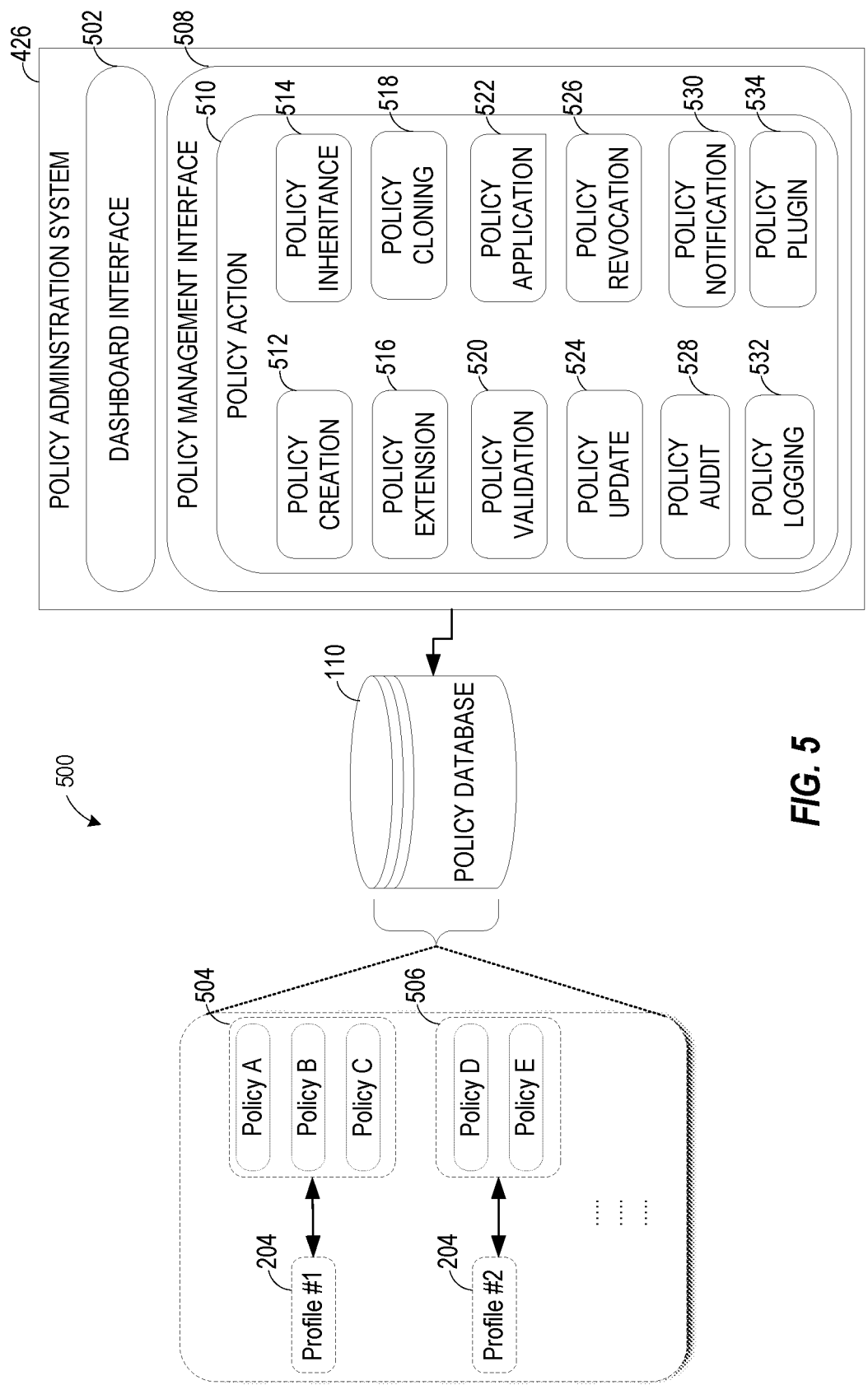
FIG. 5 is a block diagram depicting policy administration in the target environment, in accordance with an example.

Moving to FIG. 5, a block diagram 500 depicting a policy database 110 and a policy administration system 426 to facilitate policy management for workloads is presented, in accordance with an example. In some examples, the functions of the policy administration system 426 may be implemented in the system 102. Alternatively, the policy administration system 426 may be a remote computing system communicatively coupled with the system 102 over the network 110. The policy database 106 may store policies required for workload deployment and execution as described earlier. In various examples, the policy database 106 may store different types of policies, such as custom policy templates, environment-specific policies, or global policies which may be applied in any target environment 108. In various examples, the policies may be attached with tags, which may indicate one or more workload profiles 204. In some examples, each workload profile 204 may be tagged with one or more policies 504, 506. The tags may allow easy lookup, grouping, gathering of the policies in the policy database 106.

In some examples, the functions performed by the policy administration system 426 may be automated using various machine learning techniques. Alternatively, the policy administration system 426 may be manually operated by a policy administrator. In some examples, the policy administration system 426 may include a dashboard interface 502 to display a summary of the status and relationships between the policies 504, 506, the workload profiles 204, the target environment 108, and the workload 112. For example, the summary may include a list of policies 504, 506 applied in target environment 108, a list of policies 504, 506 tagged with one or more workload profiles 204, and a list of policies 504, 506 not tagged with any workload profile 204. Further, the summary may also include a mapping between the policies 504, 506 and the workload profiles 204. The dashboard interface 502 may also display the number of target environments 108 where the policies 504, 506 of a specific type, such as a web application policy, are applied. The dashboard interface 502 may also summarize a list available policies and attestation identifiers created with total number of running or active instances of the workloads 112.

The policy administration system 426 may include a policy management interface 508 for performing one or more policy actions 510 on the policies 504, 506 stored in the policy database 106. The policy management interface 508 may include a plurality of services for performing the policy actions to facilitate creating new policies, making modifications to existing policies, removing policies, and the like. Through the various policy actions 510, the policies 504, 506 may be maintained and updated periodically. In various examples, the summary displayed on the dashboard interface 502 may allow a policy administrator to monitor the status of the policies 504, 506, workload profiles 204, workloads 112, and the target environment 108 and perform one or more policy actions 510.

The policy actions 510 may include policy creation 512 for an existing workload profile 204 or a new workload profile 204. Policies for an existing workload profile may be created to enhance security and execution of the associated workloads 112. In the case of new workload profiles, existing policies as well as new policies may be used for tagging. The policy may be authored using predefined templates, or generic languages, such as Datalog or Rego. In various examples, custom policies may also be created using the templates and then applied at the target environment using a policy runtime. The policy runtime may implement a webhook, which may be used by the controller node to accept or reject workload deployment or configuration updates.

In some examples, the policy actions 510 may include policy inheritance 514. For instance, one or more policies associated with a first workload profile 204 may be made available to a second workload profile 204. One or more policies may also be inherited if the workload version has been updated and the updated workload version requires policies associated with older version of the workload. In some examples, the policies 504, 506 associated with the workload profiles 204 may be active for a predetermined period. The associated policies 504, 506 may be deactivated beyond the predetermined period. In some examples, the policy action 510 may include policy extension 516 for extending the policy 504, 506 associated with workload profile 204 beyond the predetermined period.

In some examples, the policy action 510 may include policy cloning 518 by creating one or more copies of the policies 504, 506. The cloned policies may be used for associating with one or more workload profiles 204.

The policy action 510 may also include policy validation 520 for checking whether the policies 504, 506 associated with the one or more workload profiles 204 are valid or not. The policy validation 520 may be used for ensuring that the security of the workload is not compromised.

In some examples, the policy action 510 may include policy application 522 for applying one or more policies 504, 506 in the target environment 108. The policies 504, 506 may be applied regardless of whether the associated with the workload profiles 204 or not.

In some examples, the policy action may include policy update 524 for updating one or more policies 504, 506. The policy update 524 may be performed in response to a malicious attack on the workload, malfunctioning of the workload, non-execution of the workload, and the like. In some examples, the one or more policies 504, 506 may be updated in response to a change in workload versions.

In some examples, the policy action 510 may include policy revocation 526 for revoking one or more policies 504, 506 associated with the workload profiles 204. Further, the policy action 510 may also include policy audit 528 for maintaining a historical record of the policies 504, 506. For example, the historical record may include the list of policies 504, 506 that are currently associated and were previously associated with a workload profile 204.

In some examples, a policy notification 530 may be used for providing an alert to the system 102 in response to performing any of the policy actions 510. In some examples, the policy action 510 may include policy logging 532 for creating a log of policies 504, 506 associated with each workload profile 204 and applied at the target environment 108. In some examples, the policy action 510 may include managing policy plugins 534 for managing one or more policies attached or embedded with the workload 112 for enforcing the policy associated with the workload profile 204. The policies 504, 506 may be attached or embedded during development of the workload.

Figure 6:
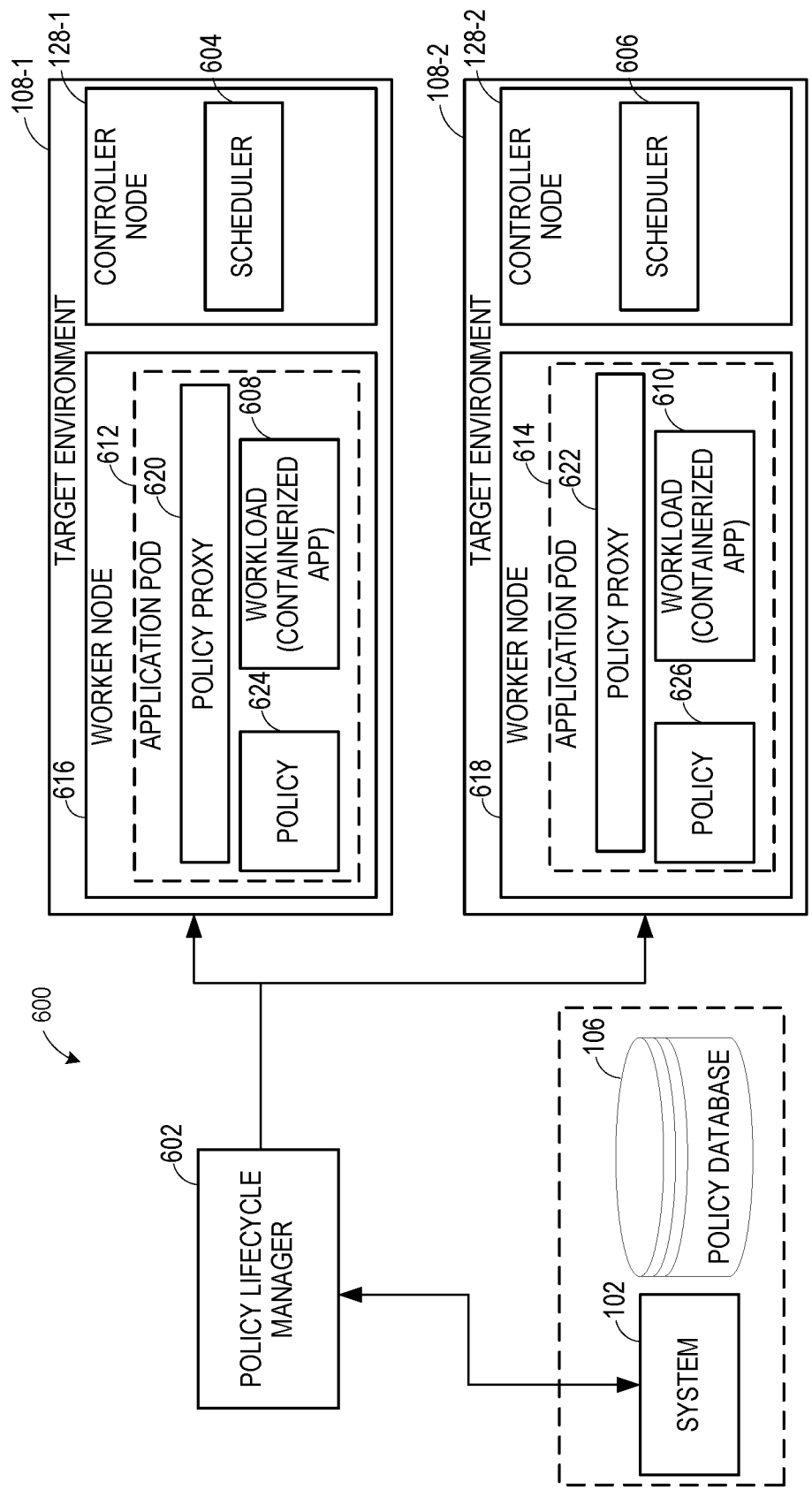
FIG. 6 is a block diagram depicting a policy lifecycle manager to apply policies dynamically in the target environment, in accordance with an example.

FIG. 6 depicts implementation of dynamic policy management in the target environment 108. A policy lifecycle manager 602 may be configured to receive a request for policies from the controller node 128-1, 128-2. In some examples, the policy lifecycle manager 602 may be an implemented as a Kubernetes Operator. The request may include the attestation identifier associated with a workload 204. The request including the attestation identifier may be provided to the system 102. The system 102 may compile the policies from the policy database 106 based on the attestation identifier and provide the compiled policies to the policy lifecycle manager 602.

The policy lifecycle manager 602 may provide the policies to the controller node 128-1, 128-2. In some examples, the controller node 128-1, 128-2 may include a scheduler 604, 606 configured to schedule the execution of workloads 608, 610 in the target environment 108-1, 108-2. As shown, the workloads 608, 610 may be containerized applications packaged in an application pod 612, 614. In other examples, the workloads may be pods, containers, virtual machines, and the like. In some examples, the target environment 108-1, 108-2 may be a Kubernetes cluster including a plurality of worker nodes 616, 618. The worker nodes 616, 618 may facilitate resources, for example, compute, storage, and/or networking capability, for the workloads 608, 610 to execute.

In some examples, the policy lifecycle manager 602 may be configured to inject the one or more policy proxies 620, 622 into the worker nodes 616, 618. The worker nodes 616, 618 may include the pods 612, 614 that includes policy proxy 620, 622 and may package one or more containerized applications 608, 610. The controller node 128-1, 128-2 may communicate with the policy proxy 612, 614 to mount policies 620, 622 to be applied in the worker node 616, 618. In some examples, the policy proxy 612, 614 may be implemented as a side car pattern. In some examples, the scheduler 604, 606 may be configured to select the one or more worker nodes 616, 618 in each target environment 108-1, 108-2 for deploying and executing the workloads 608, 610. In some examples, the target environment 108 may include a policy runtime engine (not shown in figure) for applying custom policies.

Figure 7:
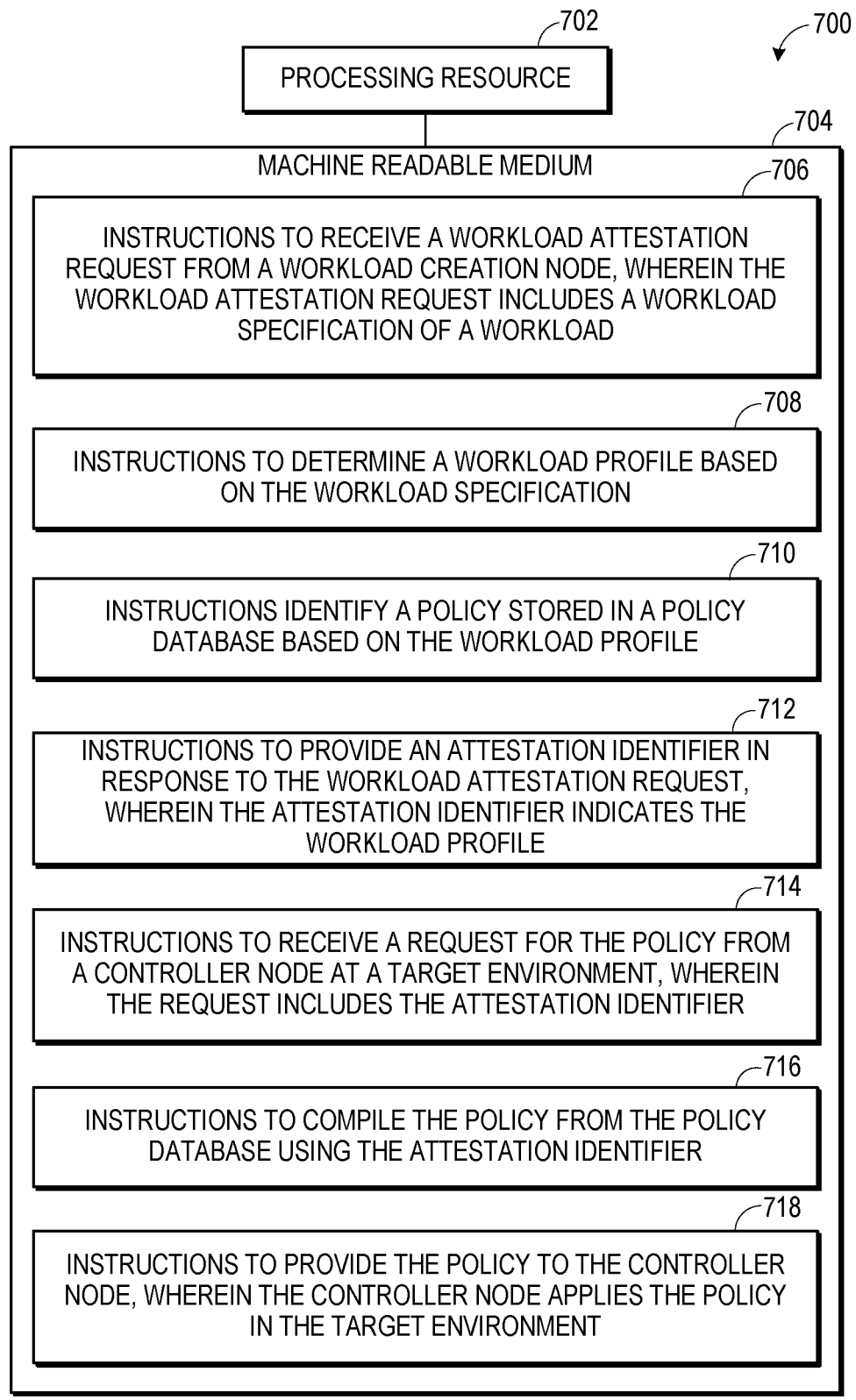
FIG. 7 is a block diagram depicting a processing resource and a machine-readable medium encoded with example instructions to manage policies in the target environment, in accordance with an example.

Moving to FIG. 7, a block diagram 700 depicting a processing resource 702 and a machine-readable medium 704 encoded with example instructions to facilitate dynamic policy management of workloads, in accordance with an example. The machine-readable medium 704 may be non-transitory and is alternatively referred to as a non-transitory machine-readable medium 704. In some examples, the machine-readable medium 704 may be accessed by the processing resource 702. In some examples, the processing resource 702 may represent one example of the processing resource 122 of the system 102. Further, the machine-readable medium 704 may represent one example of the machine-readable medium 124 of the system 102.

The machine-readable medium 704 may be any electronic, magnetic, optical, or other physical storage device that may store data and/or executable instructions. Therefore, the machine-readable medium 704 may be, for example, RAM, an EEPROM, a storage drive, a flash memory, a CD-ROM, and the like. As described in detail herein, the machine-readable medium 704 may be encoded with executable instructions 706, 708, 710, 712, 714, 716, and 718 (hereinafter collectively referred to as instructions 706-718) for performing the method 300 described in FIG. 3. Although not shown, in some examples, the machine-readable medium 704 may be encoded with certain additional executable instructions to perform the method 300 of FIG. 3, and/or any other operations performed by the system 102, without limiting the scope of the present disclosure.

The processing resource 702 may be a physical device, for example, one or more CPU, one or more semiconductor-based microprocessor, one or more GPU, ASIC, FPGA, other hardware devices capable of retrieving and executing the instructions 706-718 stored in the machine-readable medium 704, or combinations thereof. In some examples, the processing resource 702 may fetch, decode, and execute the instructions 706-718 stored in the machine-readable medium 704 to deploy workloads on one or more of the target environments 108. In certain examples, as an alternative or in addition to retrieving and executing the instructions 706-718, the processing resource 702 may include at least one IC, other control logic, other electronic circuits, or combinations thereof that include a number of electronic components for performing the functionalities intended to be performed by the system 102 of FIG. 1.

The instructions 706 when executed by the processing resource 702 may cause the processing resource 702 to receive workload attestation request including the workload specification from the workload creation node. Further, the instructions 708 when executed by the processing resource 702 may cause the processing resource 702 to determine a workload profile based on the workload specification. Furthermore, the instructions 710 when executed by the processing resource 702 may cause the processing resource 702 to identify policies stored in the policy database 106 based on the workload profile. Moreover, the instructions 712 when executed by the processing resource 702 may cause the processing resource 702 to provide attestation identifier, which indicates the workload profile, in response to the workload attestation request. Further, the instructions 714 when executed by the processing resource 702 may cause the processing resource 702 to receive a request for the policy from the controller node at the target environment. The request includes the attestation identifier. The instructions 716 when executed by the processing resource 702 may cause the processing resource 702 to compile the policy from the policy database using the attestation identifier. The instructions 712 when executed by the processing resource 702 may cause the processing resource 702 to provide the policy to the controller node, which applies the policy at the target environment.

While certain implementations have been shown and described above, various changes in form and details may be made. For example, some features and/or functions that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

The invention claimed is:

1. A method comprising:
receiving, by a processor-based system, a workload attestation request from a workload creation node, wherein the workload attestation request includes a workload specification of a workload;
determining, by the processor-based system, a workload profile based on the workload specification;
identifying, by the processor-based system, a policy stored in a policy database based on the workload profile;

providing, by the processor-based system, an attestation identifier to the workload creation node in response to the workload attestation request, wherein the attestation identifier indicates the workload profile;

receiving, by the processor-based system, a request for the policy from a controller node at a target environment, wherein the request includes the attestation identifier;

compiling, by the processor-based system, the policy from the policy database using the attestation identifier; and providing, by the processor-based system, the policy to the controller node, wherein the controller node applies the policy in the target environment.

2. The method of claim 1, wherein compiling the policy comprises:

validating the attestation identifier received from the controller node at the target environment; and retrieving the policy associated with the attestation identifier from the policy database.

3. The method of claim 1, further comprising: performing a policy action at the policy database, wherein the policy action includes policy creation, policy inheritance, policy extension, policy cloning, policy validation, policy update, or policy revocation.

4. The method of claim 1, further comprising:

receiving a notification indicative of a policy action performed at the policy database, wherein the policy action includes policy creation, policy inheritance, policy extension, policy cloning, policy validation, policy update, or policy revocation;

providing an updated attestation identifier to the controller node at the target environment;

receiving a request for updated policies for the workload, wherein the request includes the updated attestation identifier;

recompiling the updated policy based on the policy action using the updated attestation identifier;

providing the updated policy to the controller node, wherein the controller node applies the policy in the target environment.

5. The method of claim 1, wherein the policy includes a custom policy, an environment-specific policy, or a global policy applicable at any target environment.

6. The method of claim 1, wherein the workload includes a container, a pod, a virtual machine, or a containerized application.

7. The method of claim 1, wherein the workload specification includes application ports, request privileges, ingress whitelist, authentication modes, and exposure modes.

8. A policy management system comprising:

a processing resource;

a machine-readable medium storing one or more instructions that, when executed by the processing resource, cause the processing resource to:

receive a workload attestation request from a workload creation node, wherein the workload attestation request includes a workload specification of a workload;

determine a workload profile based on the workload specification;

identify a policy stored in a policy database based on the workload profile;

provide an attestation identifier in response to the workload attestation request, wherein the attestation identifier indicates the workload profile;

receive a request for the policy from a controller node at a target environment, wherein the request includes the attestation identifier;

compile the policy from the policy database using the attestation identifier; and provide the policy to the controller node, wherein the controller node applies the policy in the target environment.

9. The system of claim 8, the instructions when extended cause the processing resource to perform a policy action at the policy database, wherein the policy action includes policy creation, policy inheritance, policy extension, policy cloning, policy validation, policy update, or policy revocation.

10. The system of claim 8, the instructions when extended cause the processing resource to:

receive a notification indicative of a policy action performed at the policy database, wherein the policy action includes policy creation, policy inheritance, policy extension, policy cloning, policy validation, policy update, or policy revocation;

provide an updated attestation identifier to the controller node at the target environment in response to receiving the notification;

receive a request for updated policies for the workload, wherein the request includes the updated attestation identifier;

recompile the policy based on the policy action using the updated attestation identifier; and provide the updated policy to the controller node, wherein the controller node applies the policy in the target environment.

11. The system of claim 8, the instructions when extended cause the processing resource to create a dashboard interface for displaying a summary of the of the status and relationships between the policies, the workload profiles, the target environments, and the workloads.

12. The system of claim 8, wherein the workload includes a container, a pod, a virtual machine, or a containerized application.

13. The system of claim 8, wherein the workload specification includes one or more of application ports, request privileges, ingress whitelist, authentication modes, and exposure modes.

14. A non-transitory machine-readable medium storing instructions executable by a processing resource, the instructions comprising:

instructions to receive a workload attestation request from a workload creation node, wherein the workload attestation request includes a workload specification of a workload;

instructions to determine a workload profile based on the workload specification;

instructions to identify a policy stored in a policy database based on the workload profile;

instructions to provide an attestation identifier in response to the workload attestation request, wherein the attestation identifier indicates the workload profile;

instructions to receive a request for the policy from a controller node at a target environment, wherein the request includes the attestation identifier;

instructions to compile the policy from the policy database using the attestation identifier; and instructions to provide the policy to the controller node, wherein the controller node applies the policy in the target environment.

15. The non-transitory machine-readable medium of claim 14, further comprising instructions to perform a policy action at the policy database, wherein the policy action includes policy creation, policy inheritance, policy extension, policy cloning, policy validation, policy update, or policy revocation.

16. The non-transitory machine-readable medium of claim 14, further comprising:
instructions to receive a notification indicative of a policy action performed at the policy database, wherein the policy action includes policy creation, policy inheritance, policy extension, policy cloning, policy validation, policy update, or policy revocation;
instructions to provide an updated attestation identifier to the controller node at the target environment;
instructions to receive a request for updated policies for the workload, wherein the request includes the updated attestation identifier;
instructions to recompile the policy based on the policy action using the updated attestation identifier; and
instructions to provide the updated policy to the controller node, wherein the controller node applies the policy in the target environment.

17. The non-transitory machine-readable medium of claim 14, wherein the instructions to compile the policy from the policy database using the attestation identifier comprises:
instructions to validate the attestation identifier received from the controller node at the target environment; and
instructions to retrieve the policy associated with the attestation identifier from the policy database.

18. The non-transitory machine-readable medium of claim 14, further comprising instructions to create a dashboard interface for displaying a summary of the of the status and relationships between the policies, the workload profiles, the target environments, and the workloads.

19. The non-transitory machine-readable medium of claim 14, wherein the workload specification includes application ports, request privileges, ingress whitelist, authentication modes, and exposure modes.

20. The non-transitory machine-readable medium of claim 14, wherein the policy includes a custom policy, an environment-specific policy, or a global policy applicable at any target environment.

* * * * *